United States Patent
Kent et al.

(10) Patent No.: US 8,634,487 B2
(45) Date of Patent: *Jan. 21, 2014

(54) METHOD AND SYSTEM FOR DIVERSITY AND MASK MATCHING IN CHANNEL ESTIMATION IN OFDM COMMUNICATION NETWORKS USING CIRCULAR CONVOLUTION

(75) Inventors: Mark Kent, Vista, CA (US); Uri Landau, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/617,245

(22) Filed: Sep. 14, 2012

(65) Prior Publication Data

US 2013/0010903 A1    Jan. 10, 2013

Related U.S. Application Data

(63) Continuation of application No. 12/646,906, filed on Dec. 23, 2009, now Pat. No. 8,416,868.

(60) Provisional application No. 61/229,262, filed on Jul. 28, 2009.

(51) Int. Cl.
 *H04K 1/10* (2006.01)
(52) U.S. Cl.
 USPC .......................................... 375/260; 375/346
(58) Field of Classification Search
 USPC .................. 375/260, 346, 148; 370/208, 329
 See application file for complete search history.

(56) References Cited

U.S. PATENT DOCUMENTS

| | | | |
|---|---|---|---|
| 6,570,863 B1 | 5/2003 | Kim et al. | |
| 7,970,068 B2 | 6/2011 | Arambepola et al. | |
| 2007/0019748 A1 | 1/2007 | Hoo et al. | |
| 2007/0280366 A1 | 12/2007 | Aytur et al. | |
| 2009/0059961 A1 | 3/2009 | Shukla et al. | |
| 2009/0129493 A1* | 5/2009 | Zhang et al. | 375/260 |
| 2009/0161781 A1* | 6/2009 | Kolze | 375/260 |
| 2009/0185630 A1* | 7/2009 | Yang | 375/260 |
| 2009/0323796 A1 | 12/2009 | Futatsugi et al. | |
| 2010/0040159 A1 | 2/2010 | Lee et al. | |
| 2010/0158141 A1 | 6/2010 | Hewavithana et al. | |
| 2010/0195700 A1 | 8/2010 | Ogawa et al. | |
| 2011/0026618 A1* | 2/2011 | Kent et al. | 375/260 |
| 2011/0026619 A1* | 2/2011 | Kent et al. | 375/260 |
| 2011/0026652 A1* | 2/2011 | Kent et al. | 375/346 |
| 2011/0222393 A1 | 9/2011 | Kwak et al. | |

* cited by examiner

*Primary Examiner* — Emmanuel Bayard
(74) *Attorney, Agent, or Firm* — Sterne, Kessler, Goldstein & Fox P.L.L.C.

(57) ABSTRACT

A mobile device in an OFDM system receives an OFDM signal comprising RS tones and data OFDM symbols. The received RS tones are extracted for channel estimation using a masking operation. Masking parameters are determined by matching channel time variance using corresponding time domain samples of the extracted RS tones. As approximated channel impulse responses of transmission channels, the time samples are masked to perform the channel estimation. The channel time variance comprising inter-carrier interference and delay spread are measured, respectively. A mean of differences in power between neighbor adjacent subcarriers of the extracted RS tones is used for the inter-carrier interference measurement. The delay spread measurement such as root-mean-squared (RMS) delay spread is calculated using the approximated channel impulse responses. Masking parameters are determined based on the inter-carrier measurement and the RMS-DS measurement for generating channel estimates by masking the approximated channel impulse responses.

19 Claims, 5 Drawing Sheets

METHOD AND SYSTEM FOR DIVERSITY AND MASK MATCHING IN CHANNEL ESTIMATION IN OFDM COMMUNICATION NETWORKS USING CIRCULAR CONVOLUTION

CROSS-REFERENCE TO RELATED APPLICATIONS/INCORPORATION BY REFERENCE

This application is a continuation of U.S. patent application Ser. No. 12/646,906, filed Dec. 23, 2009 now U.S. Pat. No. 8,416,868, which claims the benefit of U.S. Provisional Patent Application Ser. No. 61/229,262, filed en Jul. 28, 2009, all of which are incorporated herein by reference.

This application also makes reference to:
U.S. application Ser. No. 12/646,744 filed on Dec. 23, 2009; and
U.S. application Ser. No. 12/646,869 filed on Dec. 23, 2009 herewith.

Each of the aforementioned referenced applications is hereby incorporated herein by reference in their entirety.

FIELD OF THE INVENTION

Certain embodiments of the invention relate to communication systems. More specifically, certain embodiments of the invention relate to a method and system for diversity and mask matching in channel estimation in OFDM communication networks using circular convolution.

BACKGROUND OF THE INVENTION

Long Term Evolution (LTE) is a Third Generation Partnership Project (3GPP) standard that provides for an uplink speed of up to 50 megabits per second (Mbps) and a downlink speed of up to 100 Mbps. The LTE standard represents a major advance in cellular technology. The LTE standard is designed to meet current and future carrier needs for high-speed data and media transport as well as high-capacity voice support. The LTE standard brings many technical benefits to cellular networks, including Orthogonal Frequency Division Multiplexing (OFDM) and/or Multiple Input Multiple Output (MIMO) data communication. In addition, Orthogonal Frequency Division Multiple Access (OFDMA) and Single Carrier—Frequency Division Multiple Access (SC-FDMA) are used on the downlink (DL) and on the uplink (UL), respectively. In the LTE standard, bandwidth is scalable from 1.25 MHz to 20 MHz. This may suit the needs of different network operators that have different bandwidth allocations and also allow operators to provide different services based on spectrum availability. LTE is expected to improve spectral efficiency in 30 networks, allowing carriers to provide more data and voice services over a given bandwidth. LTE encompasses high-speed data, multimedia unicast and multimedia broadcast services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for diversity and mask matching in channel estimation in OFDM communication networks using circular convolution, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for diversity and mask matching in channel estimation in OFDM communication networks using circular convolution. In various embodiments of the invention, a mobile device in an OFDM communication system may be equipped with one or more RE receivers to receive OFDM signals from one or more transmit antennas, also named as ports or TX antennas. The received OFDM signal may comprise a plurality of reference signal (RS) tones and data OFDM symbols. The received plurality of RS tones may be extracted and utilized to perform channel estimation for each associated channel, namely a transmit-receive path using a masking operation in each OFDM symbol. Masking parameters may be determined by matching channel time variance using corresponding time domain samples of the extracted plurality of RS tones. The channel estimation may be performed by masking the corresponding time domain samples of the extracted plurality of RS tones using the determined masking parameters. The corresponding time samples may be utilized to approximate channel impulse responses of transmission channels. The channel time variance comprising, for example, inter-carrier interference and delay spread of the transmission channels may be measured in the frequency domain and in the time domain, respectively. The interference measurement may be calculated by evaluating a mean of differences in power between neighbor adjacent subcarriers of the extracted plurality of RS tones. The delay spread measurement such as root-mean-squared (RMS) delay spread may be calculated in time domain using the approximated channel impulse responses of the transmission channels. The inter-carrier measurement and the RMS-DS measurement may be used to determine masking parameters so as to match the channel diversity. Channel estimates of the transmission channels may be generated by masking the approximated channel impulse responses of the transmission channels using the determined masking parameters. The generated channel estimates of the transmission channels may be processed for the demodulation of the data OFDM symbols in the received OFDM signal.

Figure 1A:
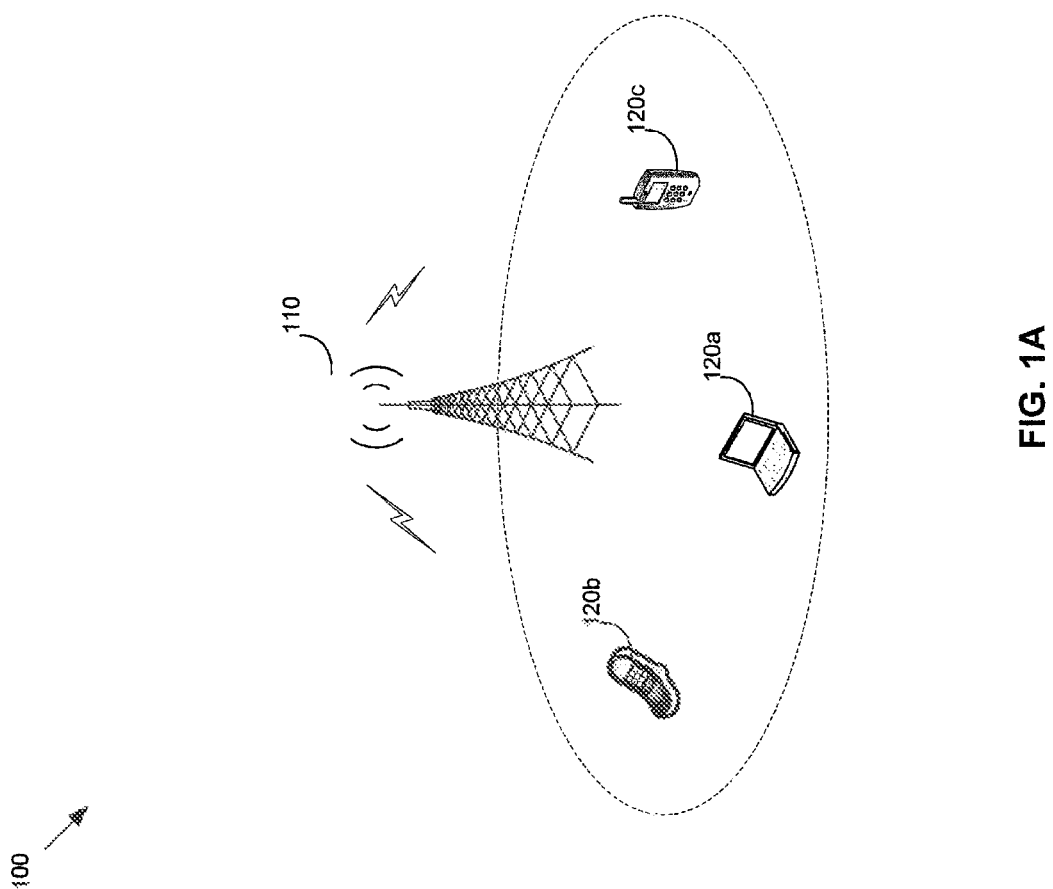
FIG. 1A is a diagram illustrating an exemplary cell in an OFDM based communication system that is operable to support diversity and mask matching in channel estimation, in accordance with an embodiment of the invention.

FIG. 1A is a diagram illustrating an exemplary cell in an OFDM based communication system that is operable to support diversity and mask matching in channel estimation in an OFDM system, in accordance with an embodiment of the invention. Referring to FIG. 1A, there is shown an OFDM communication system 100. The OFDM communication system 100 comprises a base station 110, and a plurality of mobile devices, of which mobile devices 120a-120c are illustrated.

The base station 110 may comprise suitable logic, circuitry, interfaces and/or code that are operable to manage various aspects of communication, for example, communication connection establishment, connection maintenance and/or connection termination, over, for example, the LTE air interface. The base station 110 may be operable to manage associated radio resources such as, for example, radio bearer control, radio admission control, connection mobility control, and/or dynamic allocation of radio resources for associated mobile devices such as the mobile devices 120a-120c in both uplink and downlink communication. Physical channels and physical signals may be utilized for communication in both the uplink and the downlink communication. The physical channels such as P-SCH, S-SCH, BCH, PDCCH and PCFICH in the LTE standard may carry information from higher layers and may be used to carry user data as well as user control information. The physical signals such as a reference signal may not carry information from higher layers and may be used for cell search and/or channel estimation, for example.

The base station 110 may be operable to transmit reference signals to associated mobile devices such as the mobile devices 120a-120c in a predefined grid of tones (subcarriers). RS tones of a reference signal may be located or inserted in both the frequency direction and in the time direction, respectively. The RS tones may be embedded in the data of OFDM symbols to be transmitted. The pattern of the inserted RS tones may be predetermined and known by both the transmitter and one or more corresponding receivers. For example, the RS tones may be inserted and transmitted at OFDM symbol 0 and 4 of each time slot depending on radio frame structure type and/or antenna port number. The base station 110 may be operable to index or count subcarriers used to transmit OFDM signals according to corresponding mappings in frequency spectrum. The transmitted OFDM signals may comprise RS tones and data OFDM symbols addressed to intended mobile devices such as, for example, the mobile devices 120a-120c. In the LTE standard, subcarriers may be located or spaced one tone per, for example, 15 KHz and 7.5 KHz. Subcarriers may be counted or indexed using either positive and/or negative integers at the zero crossing point of a DC subcarrier. The base station 110 may be operable to provide a vacant DC subcarrier (means no signal transmission over the DC subcarrier) to allow simplified receiver architecture such as, for example, a direct conversion receiver implementation. The vacancy of the DC subcarrier may block un-proportionally high interferences, for example, due to on-chip and/or local oscillator leakage. However, the vacancy of the DC subcarrier may result in the irregularities in the spacing of the RS tones and may cause distortions to channel estimation at the intended mobile devices such as, for example, the mobile devices 120a-120c.

A mobile device such as the mobile device 120a may comprise suitable logic, circuitry, interfaces and/or code that may be operable to communicate with a base station such as the base station 110 for services supported, for example, in the LTE standard. The mobile device 120a may be operable to initiate, maintain, and/or terminate communications with the base station 110 by performing various procedures such as, for example, cell search and/or channel quality reporting. The mobile device 120a may be operable to demodulate data OFDM symbols received from the base station 110 to identify transmitted bit streams over corresponding subcarriers.

The mobile device 120a may be operable to estimate channel conditions to determine changes in subcarrier on received OFDM signals. A change in subcarrier on the received OFDM signals may be a result of channel propagations. In order to account for time varying and frequency selective fading channels, the mobile device 120a may be operable to perform channel estimation using RS tones embedded in the received OFDM signals. Time and/or frequency tracking may be achieved using the embedded RS tones in the channel estimation. The ability of the mobile device 120a to receive data may be bound by, for example, the quality of the channel estimation. Inaccurate channel estimation may limit capability of the mobile device 120a to remove channel effects and consequently impair the throughput of the mobile device 120a.

The mobile device 120a may be operable to perform channel estimation by applying a masking operation over channel taps (time domain) of the received RS tones. Desired channel taps may be reserved by being weighted with non-zero mask values. Undesired channel taps and/or channel tap replicas may be removed by being weighted using a zero mask value, Non-zero mask values may be stored and applied during channel estimation in order to achieve low complexity channel estimation. The low complexity channel estimation may provide a way for further simplification to achieve optimal channel estimation for wide class of channels in dynamic conditions. Due to counting out the DC subcarrier in the LTE standard, pointers of subcarriers (tones) of the received RS tones may be shifted prior to channel estimation to overcome performance limitations that may exist due to irregular spacing between the RS tones.

In order to perform optimal or near-optimal channel estimation, the mobile device 120a may be operable to adaptively select masking parameters such as mask values and mask length according to dynamic channel conditions such as the level of interference present on transmission channels. The selected masking parameters are utilized for the masking operation in channel estimation. In the OFDM system 100, interference may occur in both the time domain and the frequency domain. For example, in the frequency domain, inter-carrier Interference (ICI) or the crosstalk among different sub-carriers may be caused by the loss of frequency orthogonality due to frequency instabilities, timing offset and/or phase noise. In the time domain, delay spread of transmission channels may result in inter-symbol interference (ISI). In this regard, the mobile device 120a may be operable to measure inter-carrier interference (ICI) and delay spread in the frequency domain and in the time domain, respectively. The inter-carrier interference measurement and delay spread measurement may be utilized to select masking parameters such as mask values and mask length for the masking operation in channel estimation. Accordingly, channel diversity may be matched by using the selected masking parameters for the masking operation in the channel estimation.

Although selecting masking parameters in time domain by matching dynamic channel conditions for channel estimation is illustrated for the channel estimation in downlink, the invention may not be so limited. Accordingly, selecting masking parameters in time domain by matching dynamic channel conditions for channel estimation may be applied to any RS-tone based channel estimation without departing from the spirit and scope of various embodiments of the invention.

In an exemplary operation, the base station 110 may be operable to transmit OFDM signals over LTE air interface to an intended mobile device such as the mobile devices 120a. Subcarriers used to transmit OFDM signals to the mobile device 120a may be counted or indexed in either positive or negative integers at the zero crossing point of the DC subcarrier. The DC subcarrier may be vacant and may not be used for transmission. RS tones may be embedded in the OFDM signals for time and frequency tracking at the mobile device 120a. The RS tones may be inserted and transmitted in a predefined grid of RS tones (subcarriers).

In the LTE standard, the RS tones may be irregularly spread or irregularly spaced due to the DC subcarrier counting out. At reception, the mobile device 120a may be operable to utilize the received RS tones for channel estimation in order to demodulate received data OFDM symbols. To reduce distortions created due to irregular spacing between the received RS tones, the mobile device 120a may be operable to shift pointers of the received RS tones (subcarriers) such that the resulting pointer shifted RS tones may be evenly or regularly spaced in subcarrier. The pointer shifted RS tones may be utilized for channel estimation. In this regard, in each OFDM symbol, a masking operation may be performed in time domain over channels taps of the pointer shifted RS tones to remove undesired channel taps. The masking operation may comprise an element-wise product between the channels taps of the pointer shifted RS tones and a predetermined mask. The masking operation may provide low complexity in term of computation and memory requirements in channel estimation. The undesired channel taps may be weighted with zero mask values, while desired channel taps may be weighted using non-zero mask values.

Masking parameters such as mask values and mask length may be adaptively selected according to dynamic channel conditions such as the level of interference present on transmission channels. The mobile device 120a may be operable to measure inter-carrier interference (ICI) and delay spread in the frequency domain and in the time domain, respectively. The inter-carrier interference (ICI) measurement and delay spread measurement may be utilized by the mobile device 120a to select masking parameters such that channel variance such as the channel diversity may be matched in the channel estimation. The resulting channel estimates may be time filtered, for example, to improve the quality of the channel estimates, and then converted to corresponding frequency samples. The corresponding frequency samples may be back shifted in subcarrier for frequency domain channel equalization.

Figure 1B:
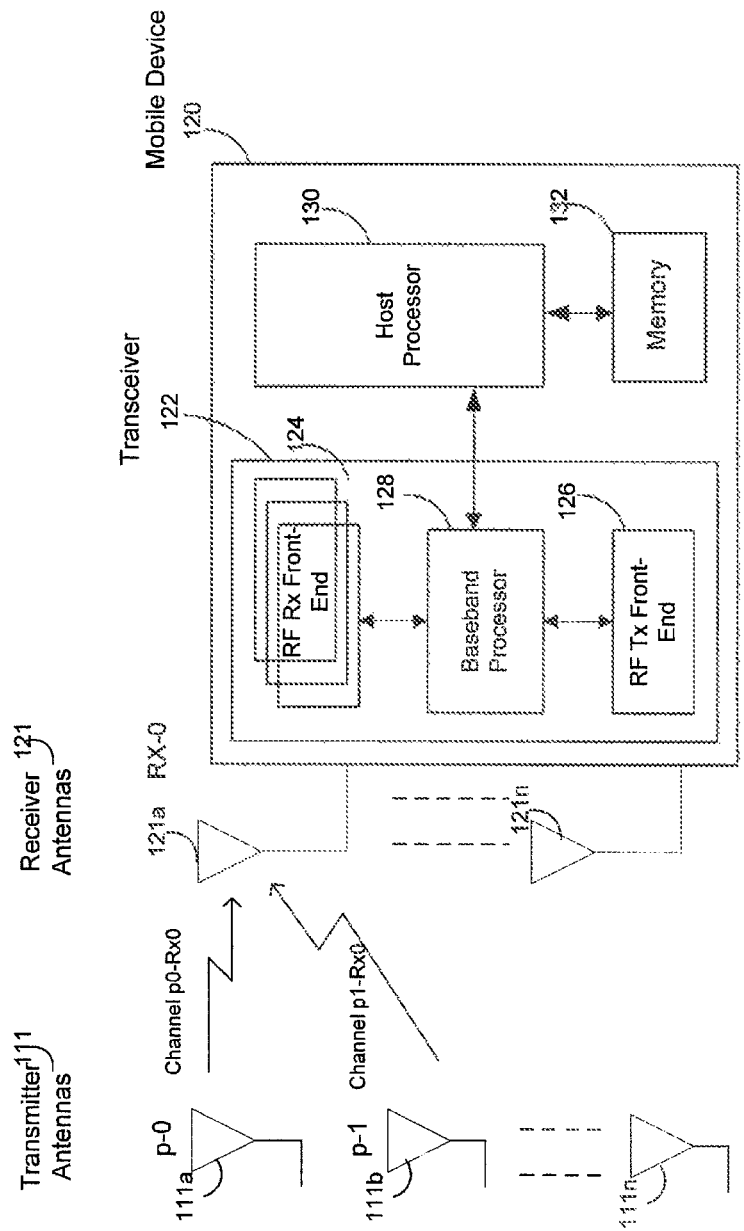
FIG. 1B is a block diagram of an exemplary communication device that may be operable to perform diversity and mask matching in channel estimation in an OFDM system, in accordance with an embodiment of the invention.

FIG. 1B is a block diagram of an exemplary communication device that may be operable to perform diversity and mask matching in channel estimation in an OFDM system, in accordance with an embodiment of the invention. Referring to FIG. 1B, there is shown a mobile device 120 comprising multiple antennas 121a-121n, a transceiver 122, a host processor 130 and a memory 132. The transceiver 122 comprises multiple radio frequency (RF) receiver (Rx) front-ends 124, a RF transmitter (Tx) front-end 126 and a baseband processor 128.

The multiple antennas 121a-121n, also named: ports or RX antennas, may comprise suitable logic, circuitry, interfaces and/or code that may be suitable for transmitting and/or receiving electromagnetic signals. In this regard, the multiple antennas 121a-121n may be operable to receive signals from corresponding multiple transmit antennas 111 (also named: ports or TX antennas). Each transmit-receive path is called a channel. For example, the FIG. 1B shows a channel between a transmit antenna 111a and a receive antenna 121a. The transceiver 122 may comprise suitable logic, circuitry, interfaces and/or code that may be operable to transmit and/or receive RF signals adhering to one or more wireless standards such as the LTE standard. The transceiver 122 may comprise multiple RF Rx front-ends 124. Each associated RF Rx front-end is used to process signals over a specific channel such as the channel between a transmit antenna 111a and a receive antenna 121a shown in FIG. 1B.

The multiple RF Rx front-ends 124 may comprise suitable logic, circuitry, interfaces and/or code that may be operable to process RF signals received, for example, over the LTE air interface, via specific antenna-pair such as the transmit antenna port-0) at the receive antenna 121a (Rx-0). The multiple RF Rx front-ends 124 may be operable to convert the received RF signals to corresponding baseband signals and perform analog-to-digital conversion of the baseband signals. The resulting digital baseband signals may be processed via, for example, pulse shaping and communicated with the baseband processor 128 for further baseband processing.

The RF Tx front-end 126 may comprise suitable logic, circuitry, interfaces and/or code that may be operable to process RF signals for transmission. The RF Tx front-end 126 may be operable to receive digital baseband signals from the baseband processor 128 and perform digital-to-analog conversion of the received digital baseband signals. The RF Tx front-end 126 may be operable to convert the resulting analog baseband signals to corresponding RF signals for transmission via the antenna 121.

The baseband processor 128 may comprise suitable logic, circuitry, interfaces and/or code that may be operable to manage and/or control operations of the RF Rx front-ends 124 and the RF Tx front-end 126, respectively. The baseband processor 128 may be operable to communicate baseband signals with the transceiver 122. The baseband processor 128 may be operable to handle baseband signals to be transferred to the RF Tx front-end 126 for transmission and/or process baseband signals from the RF Rx front-ends 124. The received baseband signals may comprise OFDM signals received from, for example, the base station 110. The received OFDM signals may comprise a plurality of RS tones and a plurality of data OFDM symbols. In this regard, the baseband processor 128 may be operable to perform various baseband procedures such as, for example, channel estimation and/or channel equalization to demodulate the received data OFDM symbols. The received RS tones may be utilized in the channel estimation. In this regard, the baseband processor 128 may be operable to estimate channels at corresponds RS tones by performing a masking operation over channel taps (time domain) of the received RS tones.

The baseband processor 128 may be operable to adaptively select masking parameters such as mask values and mask length, which are used for the masking operation in channel estimation, according to dynamic channel conditions such as the level of interference present on transmission channels. Inter-carrier interference (ICI) and delay spread may be measured in the frequency domain and in the time domain, respectively. The baseband processor 128 may be operable to utilize the inter-carrier interference measurement and delay spread measurement to select the masking parameters to match channel diversity. Accordingly, the masking parameters selected by matching channel diversity may be used for the masking operation in the channel estimation to enhance corresponding channel estimates. In instances where the RS tones may be irregularly spaced in the subcarrier due to, for example, counting out the DC subcarrier as presented in the LTE standard. Pointers in the subcarrier of the RS tones may be shifted prior to channel estimation to overcome performance limitations that may exist due to irregular spacing between the RS tones.

The host processor 130 may comprise suitable logic, circuitry, interfaces and/or code that may be operable to manipulate and control operation of the transceiver 122. The host processor 130 may be operable to communicate data with the transceiver 122 to support applications such as, for example, audio streaming on the mobile device 120.

The memory 132 may comprise suitable logic, circuitry, and/or code that may enable storage of information such as executable instructions and data that may be utilized by the host processor 130 as well as the baseband processor 128. The executable instructions may comprise algorithms that may be applied to various baseband signal processes such as channel estimation. The memory 132 may comprise RAM, ROM, low latency nonvolatile memory such as flash memory and/or other suitable electronic data storage.

In an exemplary operation, the multiple RF Rx front-ends 124 may be operable to process RF signals received, for example, over the LTE air interface, via various antenna-pair such as the transmit antenna 111a (port-0) at the receive antenna 121a (Rx-0). The received RF signals may comprise data for an intended application. The received RF signals may be converted to corresponding baseband signals and for further baseband processing. RS tones in the baseband signals may be used by the baseband processor 128 to estimate channels at corresponding RS tones. A masking operation may be performed over channel taps (time domain) of the received RS tones for low complexity channel estimation. Masking parameters such as mask values and mask length may be determined according to channel dynamic conditions such as the channel interference level.

The baseband processor 128 may be operable to measure inter-carrier interference (ICI) and delay spread in the frequency domain and in the time domain, respectively. The inter-carrier interference (ICI) measurement and the delay spread measurement may be utilized by the baseband processor 128 to select masking parameters for the masking operation in the channel estimation. Accordingly, the selected masking parameters may match the channel diversity to enhance the channel estimation. The resulting channel estimates may be time filtered to improve the quality of the channel estimates when need and may be utilized to demodulate the received OFDM signals to recover the data OFDM symbols in the baseband signals. The demodulated data OFDM symbols may be communicated with the host processor 130 for the intended application such as a video conference call on the mobile device 120.

In instances where the RS tones may be irregularly spaced in a subcarrier due to, for example, counting out the DC subcarrier as presented in the LTE standard, pointers in subcarrier of the received RS tones may be shifted prior to channel estimation to overcome distortions caused by the irregular spacing between the RS tones.

Figure 2:
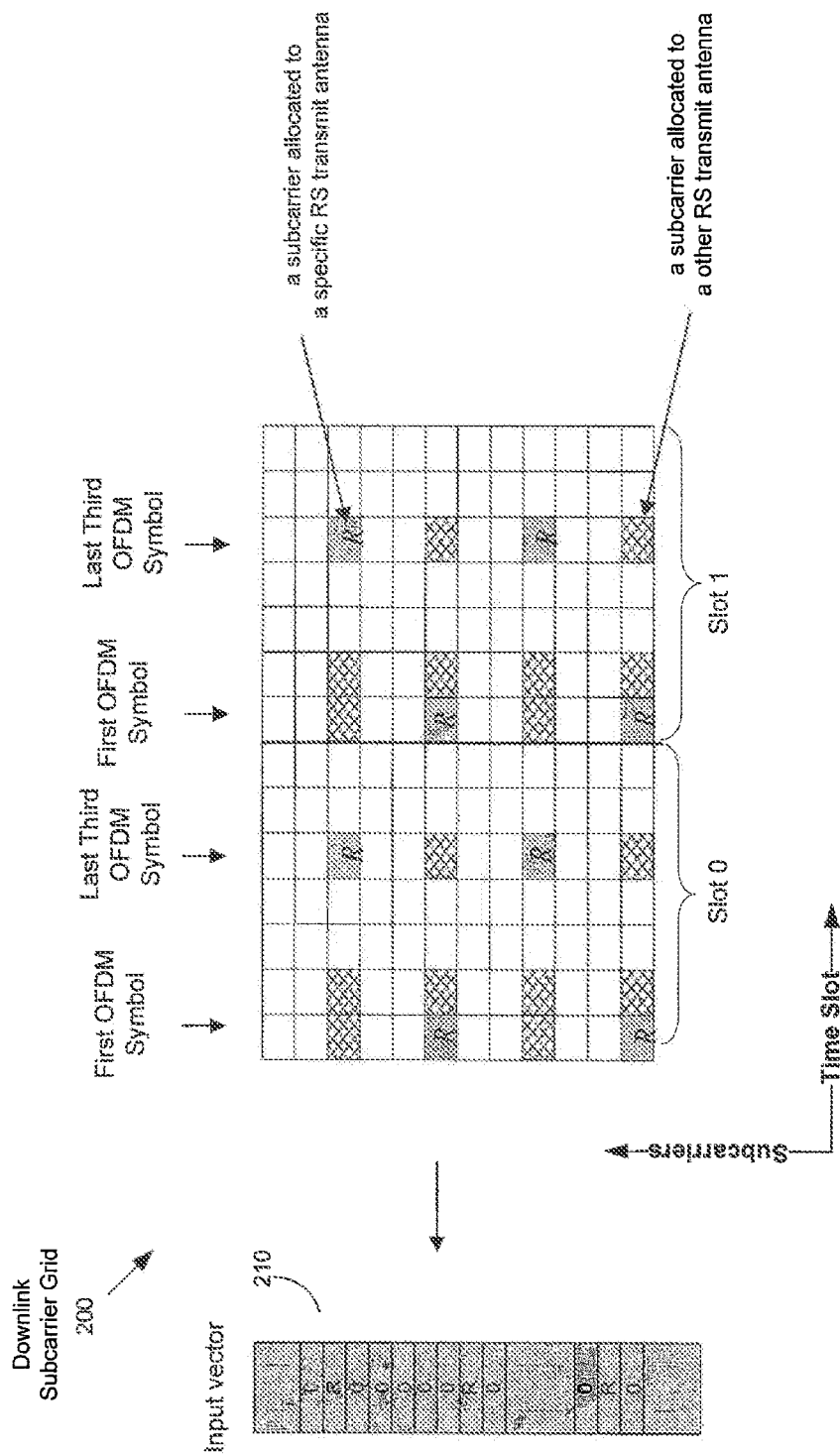
FIG. 2 is a block diagram illustrating an exemplary downlink subcarrier grid that shows occupations of embedded OFDM reference signals, in accordance with an embodiment of the invention.

FIG. 2 is a block diagram illustrating an exemplary downlink subcarrier grid that shows occupations of embedded OFDM reference signals, in accordance with an embodiment of the invention. The downlink subcarrier grid 200 comprises a plurality of RS tones that may be located or inserted in a predetermined grid of tones (subcarriers). For example, in the LTE standard, the plurality of RS tones may be placed and transmitted in, for example, the first OFDM symbol of one slot and/or on the third last OFDM symbol.

Processing a specific antenna-pair, say the transmit antenna 111a (port-0) at the receive antenna 121a (Rx-0), may be started by processing the signals that are received through the receive antenna 121a (Rx-0). After extracting a set of RS tones from the received signals, an input vector 210 of length Ns is created, where parameter Ns represents number of subcarriers. The input vector 210 may represent channel impulse responses at the RS frequencies and zeros elsewhere. The extracted set of RS tones within input vector 210 are associated with a set of location indices (or pointers or addresses) within the input vector 210. The set of pointers may also represent the RS frequencies.

In some cases a gap or irregularity in the spacing of the extracted RS tones may occur. For example, in the LTE standard the used-tones may range from 0 to N−1 tones (a subset of 0:Ns−1 tones, N is a positive integer and N<Ns); with N/2 tones below DC (DC is the zero frequency) and N/2 tones above DC. L frequencies of the extracted RS tones are mapped to the used-tone range of 0:N−1 by omitting the DC tone from the used-tone range. This RS mapping has a step of, for example, 6-tones counting over the range of 0:N−1, but it has a jump of one tone when counting the physical tones. For example, the extracted RS tones located at subcarriers [ . . . , −6, 0, 7, . . . ] may be mapped or shifted to subcarriers [ . . . , −6, 0, 6, . . . ] to achieve regularly spaced RS tones in subcarrier. With the RS mapping, the gap or irregularity in the spacing of the extracted RS tones may be corrected and minimize the distortion created in filtration and/or smoothing taking place in channel estimation process. In this regard, an IFFT operation may be applied on the pointer shifted plurality of channel RS tones for the channel impulse response.

Figure 3:
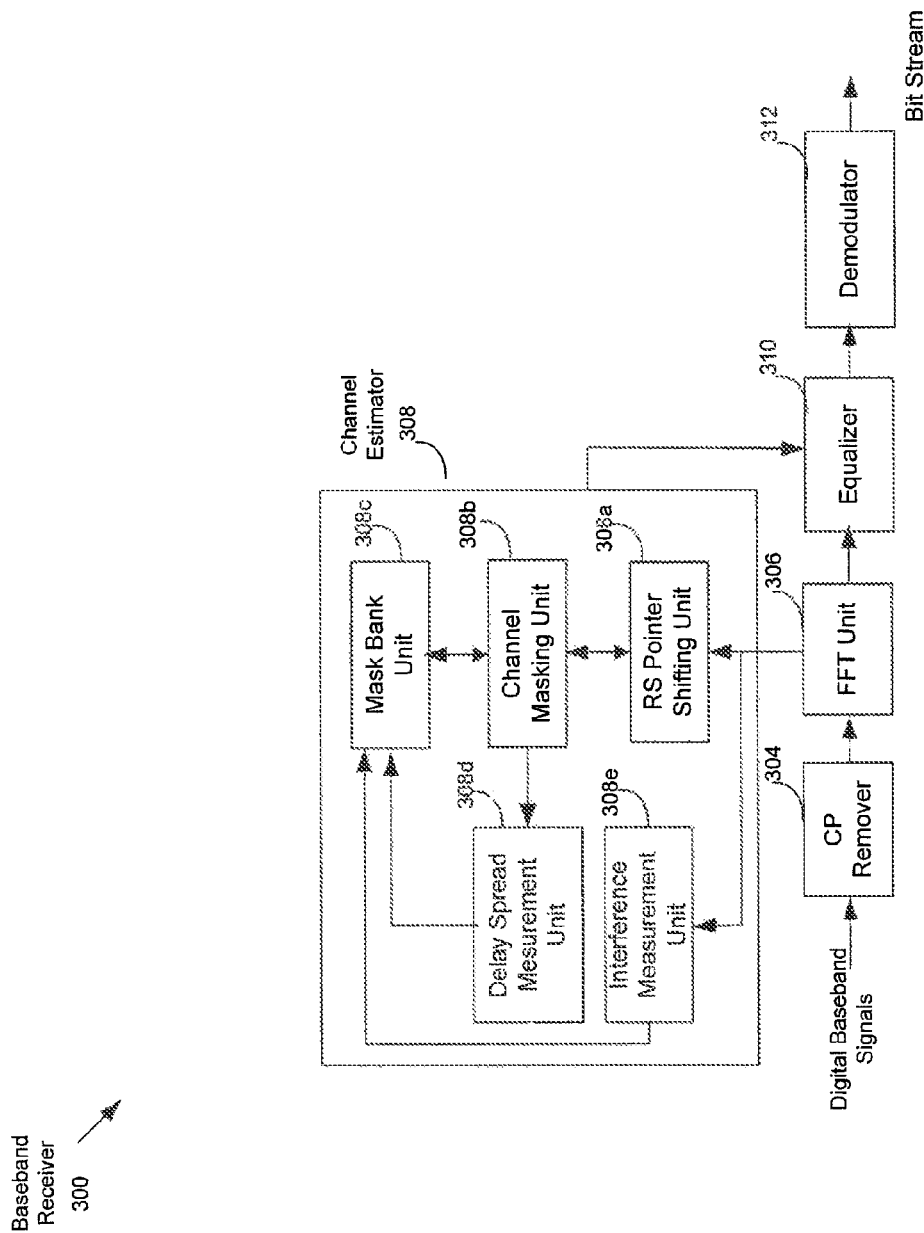
FIG. 3 is a block diagram illustrating an exemplary baseband receiver that is operable to perform diversity and mask matching in channel estimation in an OFDM system, in accordance with an embodiment of the invention.

FIG. 3 is a block diagram illustrating an exemplary baseband receiver that is operable to perform diversity and mask matching in channel estimation in an OFDM system, in accordance with an embodiment of the invention. Referring to FIG. 3, there is shown a baseband receiver 300. The baseband receiver 300 comprises a cyclic prefix (CP) remover 304, a FFT unit 306, a channel estimator 308, an equalizer 310, and a demodulator 312. The channel estimator 310 comprises a reference signal (RS) pointer shifting unit 310a, a channel masking unit 310b, a mask bank unit 308c, a delay spread measurement unit 308d, and an interference measurement unit 308e.

The CP remover 304 may comprise suitable logic, circuitry, interfaces and/or code that may be operable to remove cyclic prefix (CP) components from digital baseband signals, which corresponds to RF signals received via a specific antenna such as the antenna 121a. The CP components comprise copies of desired signal tail. The CP components may be inserted at the beginning of each OFDM symbol at transmitter to absorb or remove multipath interferences. The duration of the CP components in each OFDM symbol may be chosen so that it is larger than the expected channel delay spread to eliminate multipath interference.

The FFT unit 306 may comprise suitable logic, circuitry, interfaces and/or code that may be operable to perform fast Fourier transform (FFT) over OFDM symbols from the CP remover 304. The FFT unit 306 may be operable to convert time domain samples of the OFDM symbols to corresponding frequency domain samples for frequency domain channel equalization.

The channel estimator 308 may comprise suitable logic, circuitry, interfaces and/or code that may be operable to estimate channel conditions such as, for example, Signal-to-Interference and Noise Ratio (SINR), attenuation of high subcarriers, and/or phase shift using received RS tones. Frequency domain samples of the RS tones may be extracted from the output of the FFT unit 306 and may be used for channel estimation. Estimated channel conditions may be communicated with the equalizer 310 for channel equalization to remove, for example, inter-symbol interferences within the received OFDM symbols. With regard to the LTE standard, the received RS tones may be irregularly spaced in subcarrier due to the DC subcarrier counting out. In order to compensate distortions to channel estimation due to the irregular RS tone spacing, pointers of the received RS tones may be relocated via the RS pointer shifting unit 308a prior to channel estimation.

The RS pointer shifting unit 308a may comprise suitable logic, circuitry, interfaces and/or code that may be operable to shift pointers of RS tones in subcarrier. In this regard, the RS pointer shifting unit 308a may be operable to shift irregularly spaced RS tone to regularly spaced RS tones in subcarrier to overcome distortions to channel estimation. The regularly spaced RS tones may be converted to time domain samples (channel taps) and used for channel estimation by the channel masking unit 308b. The RS pointer shifting unit 308a may be operable to back shift or reverse shift the pointer shifted RS tones to, for example, the original locations of the received RS tones for frequency domain channel equalization via the equalizer 310.

The channel masking unit 308b may comprise suitable logic, circuitry, interfaces and/or code that may be operable to perform channel estimation in time domain using channel tap masking operation. The channel tap masking operation may be performed per OFDM symbol by applying a mask over channel taps of the pointer shifted RS tones from the RS pointer shifting unit 308a. In this regard, the channel masking unit 308b may be operable to first convert the pointer shifted RS tones into time domain samples (channel taps) using an IFFT operation. The pointer shifted RS tones may be windowed or truncated to take a portion of the pointer shifted RS tones for the IFFT operation. The size of the window, which may is utilized for the widowing or truncation, may be determined based on, for example, channel conditions. The channel taps of the pointer shifted RS tones may comprise desired channel taps, undesired channel taps, and/or channel tap replicas. The channel taps may be processed via an element-wise product through the channel tap masking operation. For example, the desired channel taps may be weighted using non-zero mask values. The undesired channel taps and/or the channel tap replicas may be weighted using a zero mask value.

The channel masking unit 308b may be operable to communicate with the mask bank unit 308c to acquire masking parameters such as mask values and mask length for the channel tap masking operation. The channel masking unit 308b may be operable to utilize the acquired masking parameters to perform channel tap masking operation on the pointer shifted RS tones in each OFDM symbol. The resulting channel estimates may be time filtered when need. The time filtered channel estimates may be converted back to corresponding frequency domain samples using a FFT operation for frequency domain channel equalization via the equalizer 310. In this regard, the corresponding frequency domain samples may be back-shifted prior to channel equalization.

The mask bank unit 308c may comprise suitable logic, circuitry, interfaces and/or code that may be operable to select masking parameters such as mask values and mask length to enhance channel estimation. The mask bank unit 308c may be operable to adaptively select masking parameters according to dynamic channel conditions such as the channel interference level. The masking parameters may be determined or selected according to channel effects in both the frequency domain and the time domain. The mask bank unit 308c may be operable to communicate with the delay spread measurement unit 308d and the interference measurement unit 308e for delay spread measurement and inter-carrier interference measurement, respectively. The masking parameters may be determined based on the delay spread measurement and the inter-carrier interference measurement of the corresponding transmission channels. The mask bank unit 308c may be operable to communicate the determined masking parameters to the channel masking unit 308b to be utilized to enhance channel estimation by matching channel diversity.

The delay spread measurement unit 308d may comprise suitable logic, circuitry, interfaces and/or code that may be operable to measure coherence of transmission channels in time domain. The delay spread measurement unit 308d may be operable to measure delay spread of transmission channels. The delay spread measurement may indicate coherence bandwidth information of the transmission channels. For example, the reciprocal of the delay spread measurement may provide estimates for coherent bandwidth of the transmission channels.

The delay spread measurement may be performed using corresponding channel impulse responses of the transmission channels. In this regard, the received RS topes may be converted into time domain samples via an IFFT operation. The time domain samples of the received RS tones may comprise a plurality of channel taps (a cluster of impulses) and/or channel tap replicas each with distinct delay, power and phase. The time domain samples of the received RS tones may reveal channel dynamic behavior such as local channel dispersion. In this regard, the time domain samples of the received RS tones may be utilized to approximate channel impulse responses at corresponding RS tones prior to the channel estimation. The approximated channel impulse responses may be utilized to calculate, for example, delay spread for corresponding transmission channels using various metrics such as a root-mean-squared (RMS) delay spread (DS).

The root-mean-squared (RMS) delay spread (DS) may be estimated and/or calculated using a root-mean-square metric for the approximated channel impulse responses at corresponding RS tones. For example, the RMS-DS, designated by $\tau_{RMS}^k$, $k=1,\ldots$, where K is the number of the RS tones, may be calculated by, $$\tau_{RMS}^k = \sqrt{\sum_i (|h_i^k| \tau_i^k)^2 - \left(\sum_i |h_i^k| \tau_i^k\right)^2},$$

where, $h_i^k$ indicates a complex number and represents a gain applied to a channel tap of an approximated channel impulse response corresponding to the kth RS tone at a delay of $\tau_i^k$, $i=0,\ldots,L$, and L represents the number of distinguishable channel taps. The gain $h_i^k$ may be time variant. The RMS-DS, $\tau_{RMS}$ may provide a quantitative measurement of the degree of delay spread produced by the corresponding transmission channel at the kth RS tone. The inverse of the RMS-DS, $\tau_{RMS}$ may indicate the changes in the channel diversity and provide a measurement of the coherence bandwidth of the transmission channel itself. In this regard, the RMS-DS, $\tau_{RMS}$ may provide information on required bandwidth for the channel estimation. The RMS-DS measurement may be communicated with the mask band unit 308c to be used to select masking parameters so as to match channel diversity in the channel estimation.

The interference measurement unit 308e may comprise suitable logic, circuitry, interfaces and/or code that may be operable to measure interference such as inter-carrier interference of transmission channels. The interference measurement unit 308e may be operable to perform inter-carrier interference measurement in the frequency domain. Various methods such as, for example, using a mean of differences of power between sounding (neighbor) noisy adjacent subcarriers, may be utilized to estimate and/or calculate the inter-carrier interference measurement. The inter-carrier interference measurement may be communicated with the mask bank unit 308c to be used to select masking parameters.

The equalizer 310 may comprise suitable logic, circuitry, interfaces and/or code that may be operable to perform interference suppression and/or compensation in frequency domain to remove inter-symbol interferences (ISI) from OFDM symbols of received signals. The equalizer 310 may be operable to mitigate the effects of ISI and not enhance the noise power in the received signal.

The demodulator 312 may comprise suitable logic, circuitry, interfaces and/or code that may be operable to demodulate received data streams to restore corresponding transmitted data.

In an exemplary operation, received OFDM baseband signals may be communicated with the OP remover 304. The OP remover 304 may be operable to remove OP components from the received OFDM baseband signals and communicate with the FFT unit 306. The FFT unit 306 may be operable to convert time domain samples associated with OFDM symbols of the received OFDM baseband signals to corresponding frequency domain samples for frequency domain channel equalization. The channel estimator 308 may be operable to extract RS tones from the resulting frequency domain samples at the output of the FFT unit 306. Pointers in subcarrier of the extracted RS tones may be shifted via the RS pointer shifting unit 308a to compensate distortions to channel estimation due to irregularly spaced RS tones. The pointer shifted RS tones may be used for channel estimation. In this regard, in each OFDM symbol, channels taps of the pointer shifted RS tones may be masked in time domain via the channel masking unit 308b.

The channel masking unit 308b may be operable to acquire masking parameters such as mask values and mask length from the mask bank unit 308c for the channel tap masking operation. The mask bank unit 308c may be operable to adaptively select masking parameters according to dynamic channel conditions such as the channel interference level. The mask bank unit 308c may be operable to communicate with the interference measurement unit 308e for the inter-carrier measurement and with the delay spread measurement unit for RMS-DS measurement, respectively. Time domain samples of the received RS tones may be utilized to approximate corresponding channel impulse responses of the transmission channels for the RMS-DS measurement. Masking parameters may be determined or selected based on the interference measurement and/or the RMS-DS measurement, respectively. The determined or selected masking parameters may be communicated with the channel masking unit 308b to enhance channel estimation by matching channel diversity, accordingly.

The resulting channel estimates may be time filtered to further improve the quality of the channel estimates when need and may be converted to corresponding frequency domain samples to provide estimated channel conditions for frequency domain channel equalization. In this regard, the corresponding frequency domain samples of the channel estimates may be back shifted in subcarrier prior to channel equalization. The equalizer 310 may be operable to remove inter-symbol interferences (ISI) from the received OFDM symbols using the estimated channel conditions. The RS tones may be removed prior to data OFDM symbol demodulation. The data OFDM symbols may be demodulated via the demodulator 312, accordingly.

Figure 4:
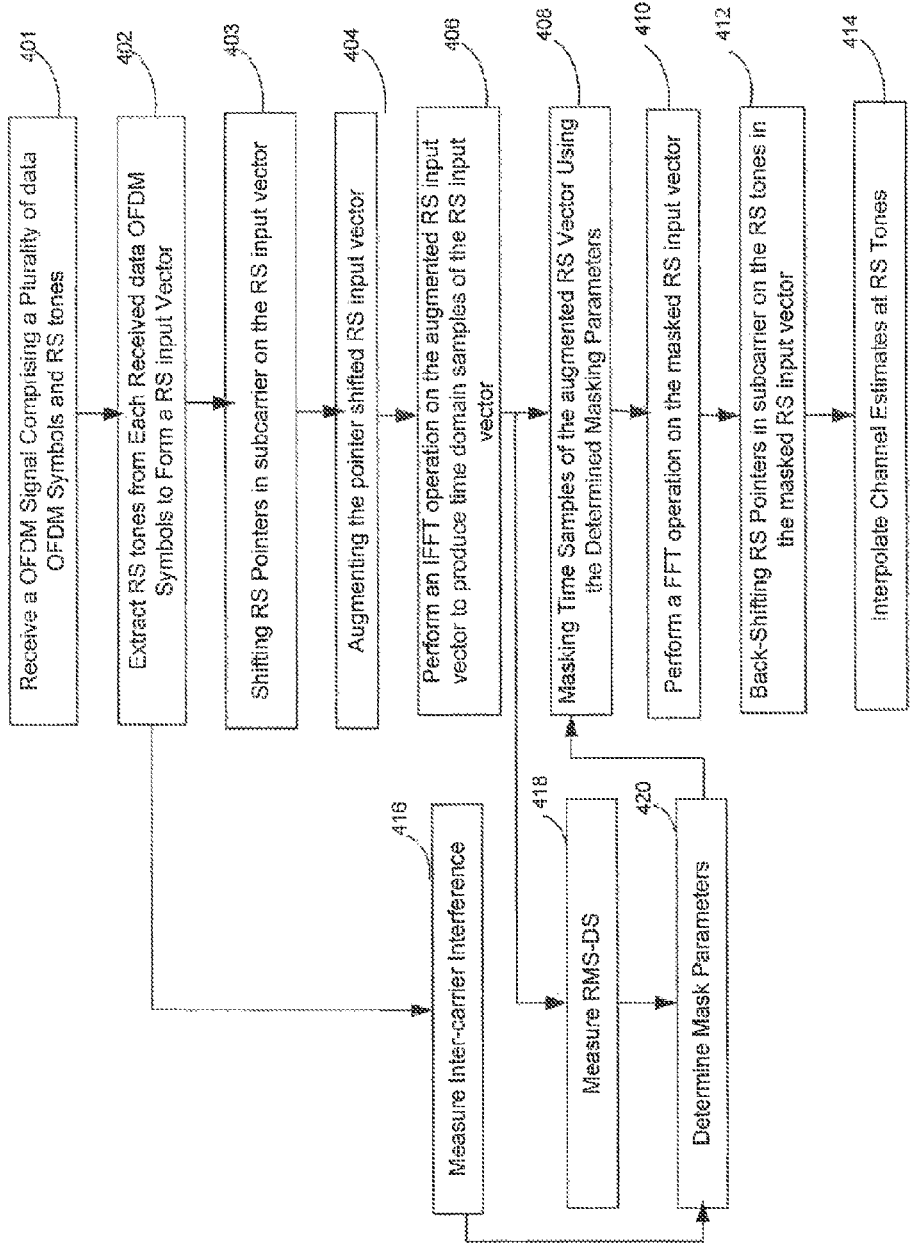
FIG. 4 is a flow chart illustrating an exemplary channel estimation procedure that performs diversity and mask matching in channel estimation in an OFDM system, in accordance with an embodiment of the invention.

FIG. 4 is a flow chart illustrating an exemplary channel estimation procedure that performs diversity and mask matching in channel estimation in an OFDM system, in accordance with an embodiment of the invention. Referring to FIG. 4, the exemplary steps may start with the step 401. In step 401, the baseband receiver 300 may be operable to receive an OFDM signal comprising a plurality of OFDM symbols and RS tones. In step 402, RS tones embedded in each OFDM symbol of the received OFDM signal may be extracted from frequency samples at the output of the FFT unit 306 to form a RS input vector to the channel estimator 308. In step 403, pointers of the extracted RS tones may be shifted in subcarrier for regularly spaced RS tones. In step 404, the resulting pointer shifted RS input vector is augmented on both sides of the pointer shifted RS input vector so as to reduce edge effects in a subsequent IFFT operation. For example, the pointer shifted RS input vector may be augmented via, for example, by repeating the last several left RS tone and the last several right RS tones, respectively. Other augmentation techniques may utilize extrapolation, windowing, etc. In step 406, the RS tones in the augmented RS input vector may be converted into corresponding time domain samples via using IFFT operation. In step 408, the time domain samples (channel taps) of the corresponding RS tones in the augmented RS input vector may be masked using determined masking parameters. The determined masking parameters may comprise mask values and mask length provided by the mask band unit 308c. In this regard, desired channel taps may be weighted with non-zero mask values. Undesired channel taps and/or channel tap replicas may be weighted with zero mask values.

In step 410, the resulting channel estimates may be time filtered to further improve the quality of the channel estimates and may be converted via FFT operation into corresponding frequency domain samples for channel equalization. In step 412, pointers of the corresponding frequency domain samples may be back-shifted in subcarrier and provided to the equalizer 310 for frequency domain channel equalization to remove ISI interferences. In step 414, channel estimates at the RS tones may be interpolated for data OFDM symbols of the received OFDM signal when need.

In step 416, inter-carrier interference may be measured via the interference measurement unit 308e. The inter-carrier interference measurement may be performed in frequency domain over the extracted RS tones in step 402. The inter-carrier interference measurement may be communicated to the mask bank unit 308c. In step 418, RMS-DS may be measured via the delay spread measurement unit 308d. The RMS-DS measurement may be provided to the mask bank unit 308c. In step 420, the mask bank unit 308c may be operable to determine masking parameters using the inter-carrier interference measurement and the RMS-DS measurement, respectively. The determined masking parameters may be utilized for masking corresponding RS tones in step 408.

In various exemplary aspects of the method and system for diversity and mask matching in channel estimation in OFDM communication networks using circular convolution, a mobile device such as the mobile device 120a in the OFDM communication system 100 may be operable to receive an OFDM signal from, for example, the base station 110. The received OFDM signal may comprise a plurality of RS tones and data OFDM symbols. The plurality of received RS tones may be extracted and utilized for channel estimation. Masking parameters may be determined by matching channel time variance using corresponding time domain samples of the extracted plurality of RS tones. The channel estimation may be performed by masking the corresponding time domain samples of the extracted plurality of RS tones using the determined masking parameters. The corresponding time samples may be utilized to approximate channel impulse responses for the transmission channels.

The channel time variance may comprise, for example, inter-carrier interference and delay spread of the transmission channels. The inter-carrier interference and delay spread may be measured in the frequency domain via the interference measurement unit 308e and in the time domain via the delay spread measurement unit 308d, respectively. The interference measurement unit 308e may be operable to perform inter-carrier interference measurement, for example, by evaluating a mean of differences in power between neighbor adjacent subcarriers of the extracted plurality of RS tones. The delay spread measurement unit 308d may be operable to perform the delay spread measurement in time domain using the approximated channel impulse responses of the transmission channels. Root-mean-squared (RMS) delay spread may be calculated for the delay spread measurement. The inter-carrier measurement and the RMS-DS measurement may be communicated to the mask bank unit 308c. The mask bank unit 308c may be operable to determine masking parameters so as to match the channel diversity using the inter-carrier measurement and the RMS-DS measurement, respectively. The determined masking parameters may be communicated with the channel mask unit 308b. The channel mask unit 308b may be operable to generate channel estimates of the transmission channels by masking the approximated channel impulse responses of the transmission channels using the determined masking parameters. The generated channel estimates of the transmission channels may be processed when need. For example, the generated channel estimates may be interpolated for data OFDM symbols and/or time filtered to further improve the quality of the channel estimates. The processed channel estimates may be utilized to demodulate the data OFDM symbols in the received OFDM signal.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for diversity and mask matching in channel estimation in OFDM communication networks using circular convolution.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for forming an estimate of a channel in an orthogonal frequency division multiplexing (OFDM) communication device, the method comprising:
    extracting a plurality of reference signal (RS) tones from a received OFDM signal to form an input vector;
    forming a time domain representation of said channel estimate using said input vector;
    measuring, to determine masking parameters, an inter-carrier interference associated with said channel or a delay spread associated with said channel; and
    masking said time domain representation of said channel estimate using said determined masking parameters.

2. The method according to claim 1, wherein measuring said inter-carrier interference or said delay spread comprises:
    measuring said delay spread using said time domain representation of said channel estimate.

3. The method according to claim 1, wherein measuring said inter-carrier interference or said delay spread comprises:
    measuring said inter-carrier interference in the frequency domain using said extracted plurality of RS tones.

4. The method according to claim 3, wherein measuring said inter-carrier interference in the frequency domain using said extracted plurality of RS tones comprises:
    determining a mean of differences between RS tones, in said extracted plurality of RS tones, that are received over adjacent subcarriers.

5. The method according to claim 2, wherein measuring said delay spread using said time domain representation of said channel estimate comprises:
    calculating a root-mean-squared (RMS) delay spread using said time domain representation of said channel estimate.

6. The method according to claim 1, further comprising:
    demodulating data symbols in said received OFDM signal using said masked time domain representation of said channel estimate.

7. The method according to claim 1, further comprising:
    before forming said time domain representation of said channel estimate using said input vector, shifting an RS tone from an original position in said input vector.

8. The method according to claim 7, further comprising:
    forming a frequency domain representation of said channel estimate using said masked time domain representation of said channel estimate.

9. The method according to claim 8, further comprising:
shifting said RS tone in said frequency domain representation of said channel estimate back to said original position.

10. A system for forming an estimate of a channel in an orthogonal frequency division multiplexing (OFDM) communication device, the system comprising:
a transform unit configured to transform an input vector comprising a plurality of reference signal (RS) tones extracted from a received OFDM signal to form a time domain representation of said channel estimate;
a measurement unit configured to measure an inter-carrier interference associated with said channel or a delay spread associated with said channel to determine masking parameters; and
a masking unit configured to mask said time domain channel estimate using said determined masking parameters.

11. The system according to claim 10, wherein said measurement unit is configured to:
measure said delay spread using said time domain representation of said channel estimate.

12. The system according to claim 10, wherein said measurement unit is configured to:
measure said inter-carrier interference in the frequency domain using said extracted plurality of RS tones.

13. The system according to claim 12, wherein said measurement unit is configured to:
determine a mean of differences between RS tones, in said extracted plurality of RS tones, that are received over adjacent subcarriers.

14. The system according to claim 11, wherein said measurement unit is configured to:
calculate a root-mean-squared (RMS) delay spread using said time domain representation of said channel estimate.

15. The system according to claim 14, further comprising:
a demodulator configured to demodulate data symbols in said received OFDM signal using said masked time domain representation of said channel estimate.

16. The system according to claim 10, further comprising:
a shifting unit configured to shift an RS tone from an original position in said input vector before said transform unit transforms said input vector.

17. The system according to claim 16, further comprising:
a Fourier transform unit configured to Fourier transform said masked time-domain representation of said channel estimate to form a frequency domain representation of said channel estimate.

18. The system according to claim 17, wherein said shifting unit is configured to shift said RS tone in said frequency domain representation of said channel estimate back to said original position.

19. A system for forming an estimate of a channel in a communication device, the system comprising:
a transform unit configured to transform an input vector comprising a plurality of reference signal (RS) tones extracted from a received signal to form a time domain representation of said channel estimate;
a measurement unit configured to measure an inter-carrier interference associated with said channel or a delay spread associated with said channel to determine masking parameters; and
a masking unit configured to mask said time domain channel estimate using said determined masking parameters.

* * * * *

UNITED STATES PATENT AND TRADEMARK OFFICE
CERTIFICATE OF CORRECTION

| | |
|---|---|
| PATENT NO. | : 8,634,487 B2 |
| APPLICATION NO. | : 13/617245 |
| DATED | : January 21, 2014 |
| INVENTOR(S) | : Mark Kent et al. |

It is certified that error appears in the above-identified patent and that said Letters Patent is hereby corrected as shown below:

In the Specification

Column 1, line 14 please replace "filed en July" with --filed July--.

Signed and Sealed this
First Day of July, 2014

Michelle K. Lee
*Deputy Director of the United States Patent and Trademark Office*